United States Patent Office 3,351,381
Patented Nov. 7, 1967

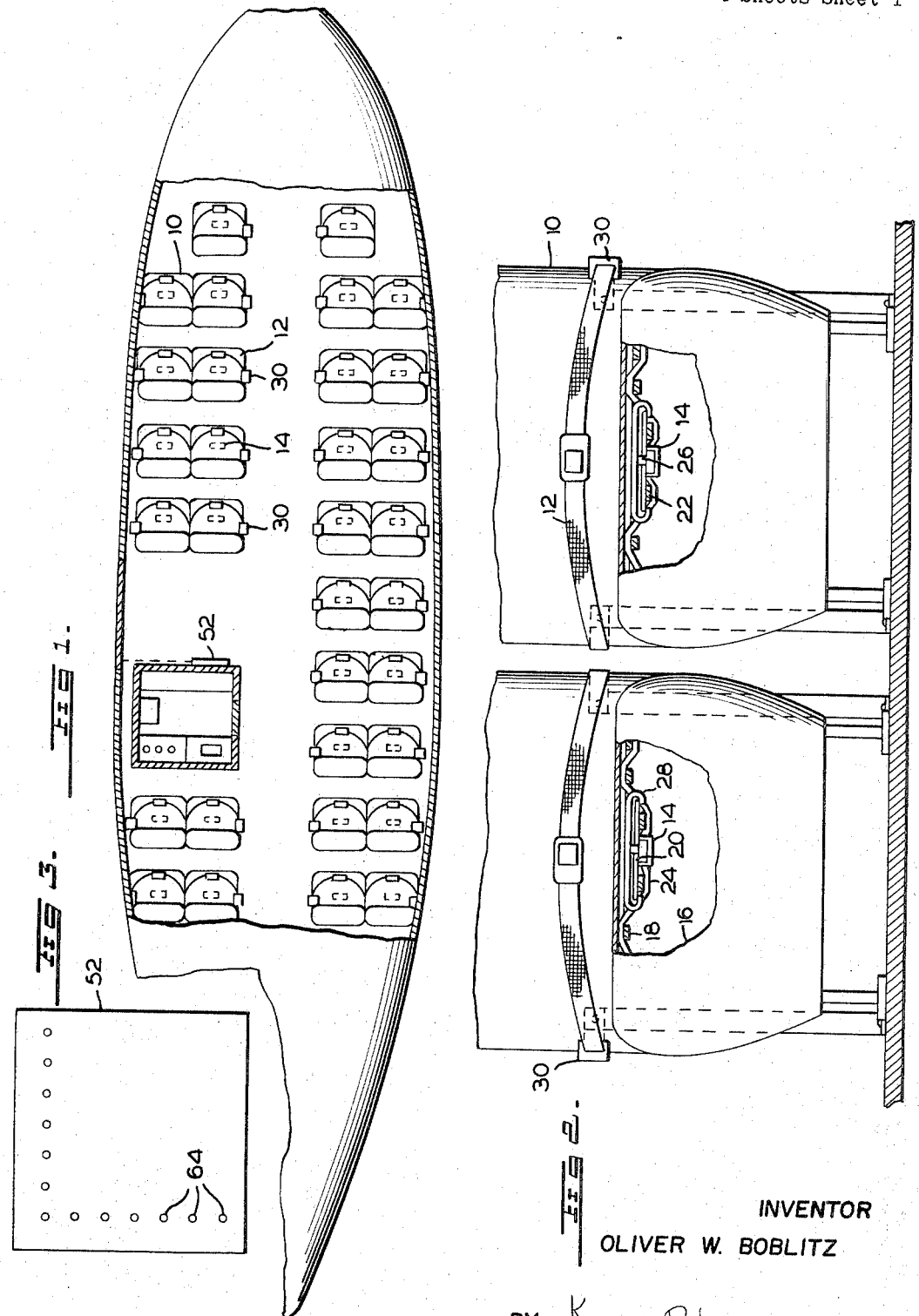

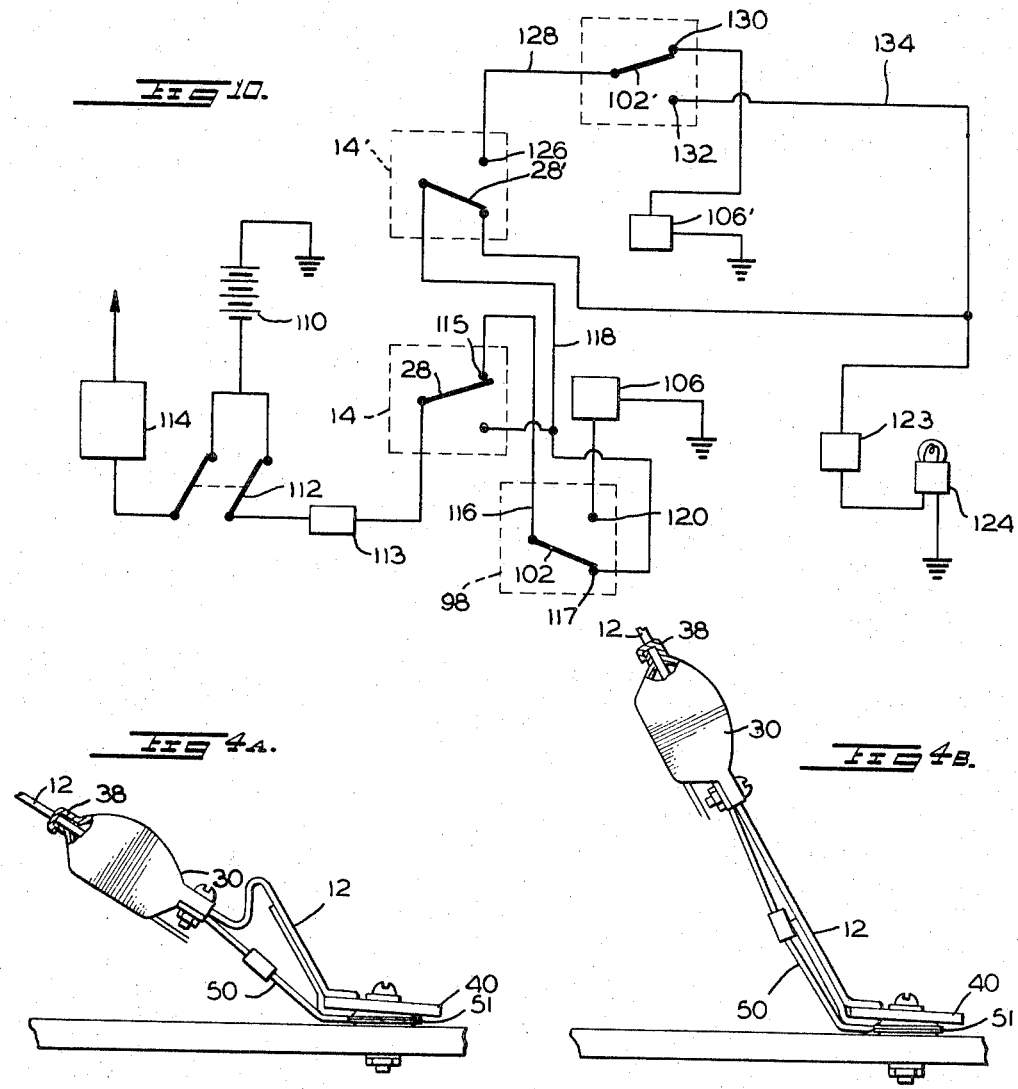

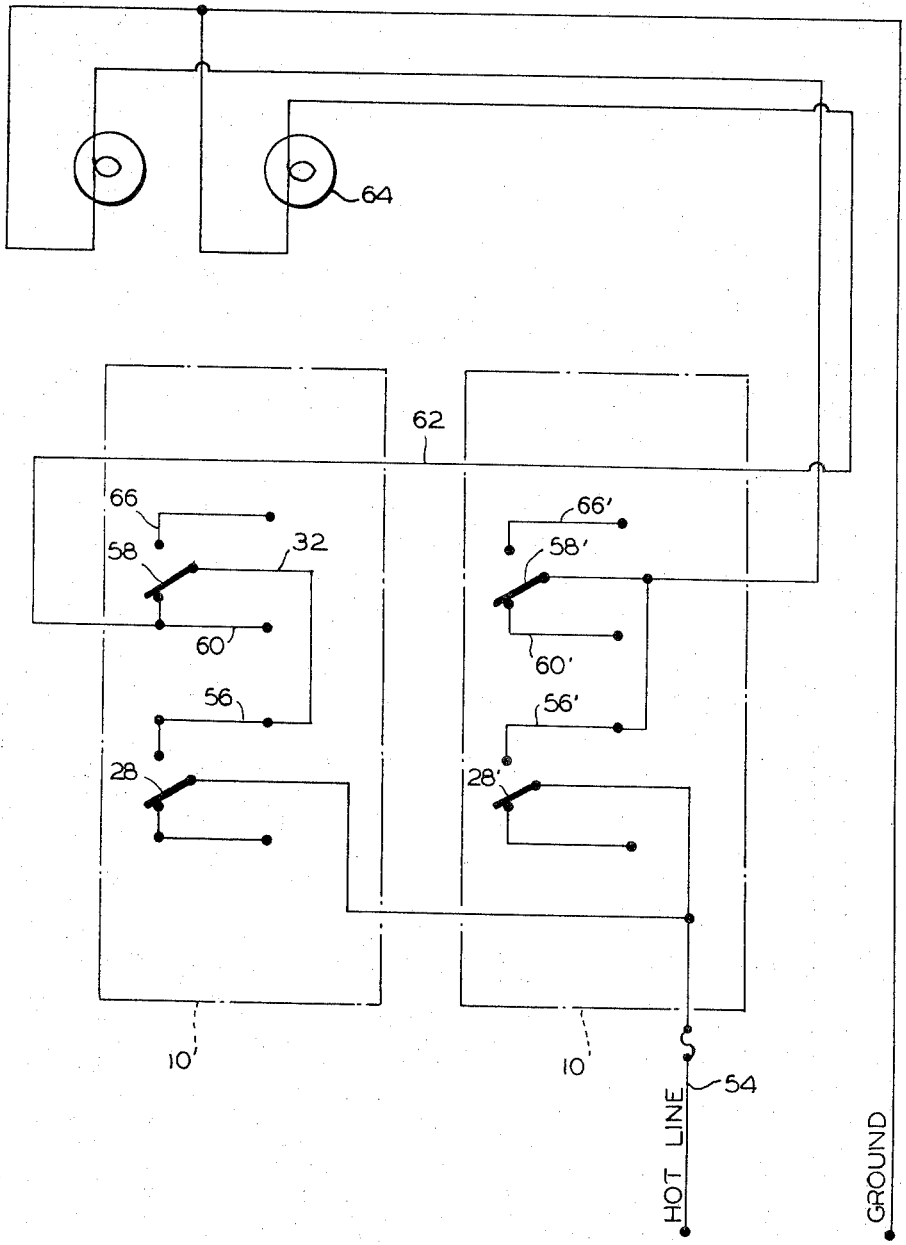

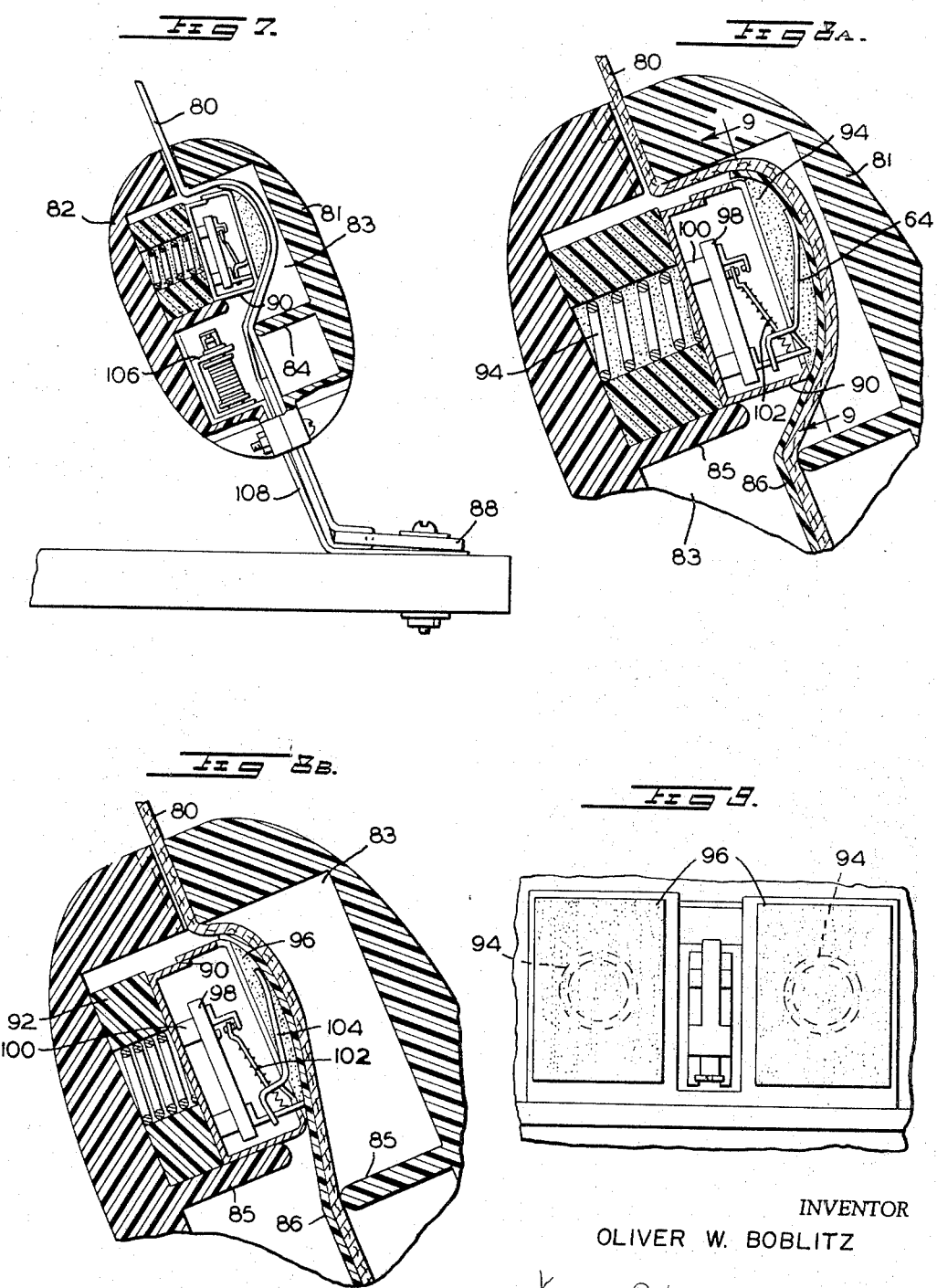

3,351,381
AUTOMATIC SAFETY BELT DEVICES
Oliver W. Boblitz, 4607 Connecticut Ave. NW.,
Washington, D.C. 20008
Filed Aug. 4, 1966, Ser. No. 570,324
11 Claims. (Cl. 297—385)

This invention relates to a new and improved safety belt system to be employed in vehicles such as aircraft, cars, busses and the like.

Experts in the field of automotive and aircraft safety have long agreed that if seat belts were used and used properly by all vehicle passengers at all times, fatalities would be reduced by twenty-five percent and serious injuries by fifty percent. At the present time, approximately forty million automotive vehicles in the United States of America are equipped with seat belts of the lap type, and new car manufacturers are installing lap type seat belts as standard equipment.

The advantages of seat belts have not, however, been realized. Instead, 1965 was the worst year for death and injuries due to accidents involving automotive vehicles that the United States has ever had, and it is expected that the death toll on the highways and the injuries resulting from collisions between cars and the like will continue to be on the rise.

Fatalities and injuries that occur in ground transportation accidents usually result from either of two types of motivating causes, the first being a collision between vehicles or between a vehicle and stationary object. The second cause is related to a secondary collision occurring when an occupant of a vehicle is thrown either out of the vehicle or against inanimate objects within the vehicle, such as the steering column, dash, windshield, etc. It is with respect to this latter type of motivating cause of deaths and injuries that the present invention is concerned.

Statistical studies have been made that conclusively show that the number of fatalities and injuries resulting from secondary collisions within a car or the like may be significantly reduced if safety seat belt systems are used, and if they are used properly. It is precisely the "if used" element that most patented seat belt systems are concerned with, and it is precisely with this type of element that most patented systems are defective. It may also be stated as an observation on human behavior that safety systems which require the voluntary cooperation of the user are not anywhere near as effective as systems that do not require voluntary cooperation. Thus in the history of the development of the automobile, statistical studies proved that large numbers of users were being killed and injured by broken glass in automobile accidents. This hazard to the use of cars, busses, trucks and the like was eliminated through legislation requiring the use of safety plate glass for windshields and the like. The same sort of requirement can be built into safety seatbelt systems by making it mandatory that vehicle users fasten their seat belt. But the mere fastening of a seat belt will not be sufficient to reduce the numbers of fatalities and injuries by the percentages heretofore set out.

In order for safety seat belt systems to be effective, it is necessary that they be fastened properly around each person in the vehicle before it starts moving. There is no way of ascertaining when the car must slow down quickly or stop suddenly, and an emergency situation can occur whether the automobile is being driven for half a city block or a hundred miles or more. Safety seat belts, in order to be used properly, must be fastened snugly around the hips of each person in the conveyance at all times. The mere act of connecting the two belt straps together does not constitute proper use of seat belts. In order to obtain the full protection available from safety seat belt systems, it is an absolute necessity that they be fastened snug at all times and that they remain in this condition as long as the vehicle is being operated. This last consideration, that of snugness, is required whether the vehicle be an automobile, a truck, a bus or an airplane. There is also the attendant difficulty of the user of the belt not knowing the degree of snugness that would give him or her the full measure of protection of the system, and it is with this feature of safety seat belt systems that the present invention is concerned.

Safety seat belts of the "lap type" must be fastened snugly around the pelvis of the user for the additional reason that if a seat belt is loosely fastened, and the vehicle in which he is travelling is forced to stop suddenly, the user might well receive internal injuries as a result of being thrown against the loose belt. Under some circumstances, a loosely fastened belt may well cause the user to be thrown against the internal parts of the vehicle in which he or she is riding, thus depriving the belt user of the major form of protection that belts were devised for, namely, protection against secondary collisions.

The problems encountered in the air carrier industry are similar as to those described with reference to land forms of transportation. The normal procedure in passenger aircraft requires passengers to fasten their seat belts during landing and take-off operations. In this regard, the aircraft crew normally checks each passenger individually to ascertain not only whether the passenger has fastened his or her seat belt, but also to ascertain whether the seat belt has been properly fastened. The crew member, usually a stewardess, visually determines the condition of the passenger's seat belt. Under such circumstances, the stewardess does not know if a passenger has fastened his seat belt correctly since the visual inspection is inadequate to make such determination. In addition, it is impractical to keep a constant check on all passengers, e.g., the stewardess must of necessity also strap herself in during landing and take-off procedures.

Prior art devices have in the main incorporated switching elements in the buckles of the seat belts, which switching elements are wired into either an indicating system and/or the ignition system of the vehicle. Generally, when such systems are used, they make it impossible for the vehicle to be operated unless all seat belts and their switches are closed. This simply means that an automotive vehicle or the like cannot have the motor running at any time the seat belt is unfastened, a condition that can be hazardous in slow moving traffic conditions. These types of systems also have the undesirable quality of not forcing any potential user of the seat belt to fasten the belt properly. In order to activate the automotive ignition circuit, it is only necessary that the belt be fastened, i.e., it is not necessary that the belt be fastened properly. This means that the entire purpose of the system as incorporated within the vehicle can be defeated by either loosely coupling the seat belts together either around the driver and passengers, or by coupling them together and sitting on them.

Systems that provide a belt buckle-operated switch of the type that do not utilize the ignition circuitry of the vehicle, but rather utilize an indicating device on the panel of the vehicle, are likewise defective. Again, the belts may be loosely fastened to eliminate the telltale light that would show that the belts are not fastened, but in so fastening the belts, the proper degree of snugness is not obtained. In addition, it is entirely possible that the user of this latter-described system might very well ignore the indicator while using the vehicle.

In my prior applications, Ser. Nos. 484,655, filed Sept. 2, 1965 and 407,483, filed Oct. 30, 1964, I have described seat belt systems that are improvements over the prior art. In particular, I have described an analogous system to that of the present invention, wherein a seat belt of the roll up type has incorporated therein means for insuring the proper fastening of the seat belt. I have also described an indicating device to be mounted such that if the seat belts of passengers riding in the vehicle are not properly fastened, a law enforcement officer positioned externally of the vehicle may ascertain this fact. Obviously, such a system requires that there be traffic laws requiring that all occupants of automotive vehicles wear their seat belts while travelling in the vehicles, and in addition that they wear them properly.

The present application is directed to safety seat belt systems of the non roll-up type to be incorporated into automotive and aircraft vehicles presently equipped with seat belt systems. The system of the present invention may also be installed in vehicles at assembly points when the vehicles are being equipped with non roll-up type seat belts. It is contemplated that this system will effectively require the proper use of seat belts, and thus eliminate the "if used" element, whether or not traffic legislation is passed requiring the use of seat belts in automotive vehicles. In addition, it is contemplated that the system herein described will provide an efficient indication relative to the operative condition of seat belts of the type with which this application is concerned, to law enforcement officers for the purpose of enforcing the use of seat belt systems.

It is therefore a primary object of this invention to provide new and improved seat belt systems to be used with vehicles equipped with the non roll-up type of seat belt for insuring that the belt be properly fastened around the occupant of any seat equipped with a belt within the vehicle.

It is another object of this invention to provide a new and novel electrical switch to be used with a safety seat belt system and to be operated by the seat belt when said belt is fastened.

It is a further object of this invention to provide a safety seat belt system incorporating novel switching means whereby the occupant of a seat equipped with a seat belt will be automatically informed of the non-operative condition of his or her seat belt by signal means in such a manner that the indication will continue until such a time as the seat belt has been properly fastened.

It is the additional object of this invention to provide a novel seat belt system including switching circuitry for use with safety seat belts whereby an indication is given at some central point relative to the vehicle as to the operative condition of all seat belts within the vehicle.

It is another object of this invention to provide a novel fail-safe switching system for use with seat belts of the non roll-up type that is light in weight, inexpensive to manufacture, durable, and that permits of installation in all existing seat belt systems of the type described.

It is a further object of this invention to provide a novel safety seat belt system for aircraft including novel electrical circuitry for providing an aircraft crew with an indication of the operative conditions of all passenger seat belts within the plane.

These and other objects of this invention will become clear upon a study of the hereinafter described embodiments of the invention taken in conjunction with the drawings in which:

FIGURE 1 is a plan view of a passenger aircraft fuselage having portions broken away to show the seating arrangement with closed safety belts, seat switches, and a centrally-located indicating panel;

FIGURE 2 is a front elevational view of a pair of seats in the aircraft of FIGURE 1, and has portions broken away to show the position of switches within these seats;

FIGURE 3 represents a typical indicating panel to be utilized with the system of this invention when the system is employed in aircraft;

FIGURES 4a and 4b are side elevational views of a seat belt switching structure shown in the operated and non-operated conditions respectively; said structure to be used in the system of FIGURE 1;

FIGURE 5 is a sectional view of FIGURE 4a;

FIGURE 6 is a wiring diagram showing a representative portion of the connections between the various switches of FIGURES 4 and 5 and the panel shown in FIGURE 3;
URE 3;

FIGURE 7 is a side sectional view of a seat belt switch and audible indicator o be incorporated into an automotive vehicle;

FIGURES 8a and 8b show the switch of FIGURE 7 in greater detail and in the unoperated and operated conditions respectively;

FIGURE 9 is a sectional view taken along the line 9—9 of FIGURE 8a; and

FIGURE 10 is a schematic diagram of an electrical circuit incorporating the switches and indicators of this invention in an automotive vehicle.

The objects of the invention are accomplished through the incorporation of a novel switching system to be used with non roll-up type seat belts in combination with a pressure-operated switch located in the horizontal portion of a passenger or driver's seat. The switch of the present invention is wired into a novel electrical system that in one embodiment includes a plurality of indicating devices representative of each of the seats so equipped where said devices are located at a central point within the vehicle. In another embodiment of this invention, a plurality of indicating devices are located one each at each of the seats equipped with switching structure built in accordance with the teaching of this invention. The indicating device(s) is responsive to the weight of a passenger occupying the seat, and will continue an indication until the associated seat belt is properly fastened. A novel switch is associated with each seat belt, and it is operated by the seat belt but only after the seat belt has been placed in a predetermined degree of tension, where the operating force necessary to operate the switch does not vary, notwithstanding substantial differences in the physical dimensions of persons occupying the seats. The system also includes a centrally-located indicating feature which is operative only in response to the operated or unoperated condition of seat belts at only those seats that are occupied in the vehicle.

The safety seat belt system of the present invention, as that seat belt system is incorporated into an aircraft of the passenger type, is shown in FIGURES 1–6 of the drawings. As shown in FIGURE 1 of the drawings, a plurality of seats 10 are each individually equipped with a seat belt 12 and an electrical switch 14 centrally located in the horizontal portion of the seat 10. The switch 14 is a pressure-sensitive switch of the single pole-double throw type and is so located that it will be activated in response to the weight of a passenger sitting down in the seat. The switch 14 is lightweight in construction, is small in size, and in one embodiment of this invention was approximately 6 inches long by ¼ inch wide by ⅛ inch thick. The switch is uniquely designed for use in passenger and driver seats in both aircraft and automotive vehicles in that it does not create unsightly protrusions or cause discomfort to the occupant of the seat. This is made possible in the aircraft passenger seats in that the chair is actually built up on a framework, and comprises outer cover members 16, fastened to the frame and over a flexible but sturdy webbing 18.

That portion of the webbing located in the horizontal section of the chair 10 is positioned immediately beneath the outer covering members. The webbing consists of two sets of interwoven panels arranged horizontally and at angles of 90° to each other, and it is this sort of webbing construction that permits the mounting of a switch having the configuration described above within the webbing by interweaving same therein as shown in FIGURE 2 of the drawings. The switch 14 is also provided with a plate 20 to provide additional support for the switch. The plate 20 and the switch 14 extend in the direction of a plurality of web panels 22 and is interwoven with web panels 24 where the latter members are arranged at 90° relative to the panels 22. This construction provides a sturdy yielding support for the switch which does not impede its operation, nor does it discomfort the passenger.

The switch is also provided with an operating arm 26 which projects vertically in the direction of the horizontal portion of the seat 10. It, as shown in FIGURE 2 of the drawings, is located beneath the cover material 20 and is set to operate in response to a passenger occupying the seat. In order that the operating arm 26 will not cause the passenger discomfort, an additional piece of webbing 28, or a lightweight sturdy plastic plate member curved at both ends so as to frictionally engage the plate 20, is passed over and frictionally engages the switch arm 26. With this construction, an occupant of the seat will sit on the member 28 and by so doing will operate the switch 14 by depressing its operating arm 26.

The seat belt 12 is provided with a housing 30 for incorporating therein a belt-operated switch 32 of the single throw-double pole type, which switch is shown in a side sectional view in FIGURE 5 of the drawings. The housing 30 may be made from durable lightweight plastic materials, for example, it may consist of top section 34 and a bottom section 36 molded from a vinyl plastisol. The top section is provided with side walls, a dome-shaped top wall, and two projecting flanges 35 and 35'. The flanges extend in opposite directions longitudinally along the belt 12. The bottom section 36 is saucer-shaped in elevation as seen in FIGURE 5, and is also provided with two flange members 37 and 37'. The flanges 35 and 37 are located adjacent to each other in superimposed relationship. The flanges 35' and 37' are similarly located relative to each other, and the member 35' is provided with slotted lip portion 38 for frictionally engaging the member 37' to thus close the housing 30 at one end thereof.

The belt 12 is passed through the slotted portion of the lip 38 and extends through the housing 30. The belt is looped upon itself through a conventional mounting lug 40, which lug is bolted to the frame of the seat by conventional means such as by bolting. The lug is preferably made out of a conductive metal in order that it may be used as a ground connection in an electrical circuit. The belt 12 is also secured to the housing 30 between the flanges 35 and 37 by conventional means such as a screw-and-bolt arrangement, which means is also used to secure the housing members 34 and 36 together at the end opposite the lip portion of the upper section 34.

Switch 32 is mounted within a generally rectangular switch housing 42, and the latter member is affixed to the inside bottom wall of the member 36 by gluing. Obviously other means could be employed for this latter purpose.

The switch housing is made out of a lightweight durable plastic, and is provided with a slotted top wall, through which an operating lever 44 of the switch 32 extends. The lever 44 cooperates with a movable contact arm 45 of the switch, which arm is made out of spring metal to provide operating bias for the switch 32. In this regard, it must be noted that it will take a specific amount of force exerted on the lever 44 in order to operate the switch. An additional switch biasing means is provided by a plastic foam member 46, which member is gummed on one side and is mounted on the top wall of the switch housing 42. The foam bias member 46 is provided with a passage through which the operating lever 44 extends, or it may comprise a pair of members mounted on either side of the lever. The lever 44 and the foam members have equal height above the top wall of the switch housing.

A tongue-shaped plate 48 is mounted for pivotable motion within the belt housing 30 and is secured on one end between the flanges 35 and 37. The plate frictionally engages the foam member 46 and the operating lever 44 on one surface and is slidably engaged on its other surface by the belt 12. When the belt is loose or unfastened the plates does not place the foam member and switch operating arm in compression.

Additional switch bias is provided by an elastic element 50, also secured between the flanges 35 and 37 by the bolt and screw arrangement, and secured on its opposite end to the frame of the seat by a mounting ring 51 and the conventional means for bolting the lug 40 to the frame.

As shown in FIGURE 4a of the drawings, when the belt 12 is not being used, or when the belt has not been properly fastened, that is to say, the belt has only been too loosely fastened, the member 50 will hold the housing 30 and belt in the position shown in FIGURE 4a of the drawings. In order to fasten the belt and in order to operate the switch 32, it is first necessary for the passenger to place the member 50 in tension, as shown in FIGURE 4b of the drawings. After the member 50 has been placed in tension, continued exertion of tensile force on the belt 12 will cause the plate 48 to be deflected through the frictional engagement of the belt and the plate, thus putting the foam member 46 and the switch operating lever 44 in compression. In order to operate the switch 32, it is necessary for the occupant of the seat to overcome a series combination of elastic forces which may be represented by a general formula comprising the addition of the spring constants of the members 44, 46 and 50. These forces can be predetermined and selected through the proper selection of materials so that the switch 32 cannot possibly be operated until the belt is snugly fit around the pelvis of any person that might occupy the seat.

Each seat 10 is provided with a switch 14 and a belt-operated switch 32, which switches are serially operated and serially and electrically connected to each other and to a centrally located lighting panel 52. The panel 52 may be located at the stewardess station as shown in FIGURE 1 of the drawings. The panel comprises a plurality of lights arranged in rows and columns where only one row and one column is represented in FIGURE 3. Each of the lights located on the panel 52 is connected in an electrical circuit to one of the seats in the aircraft.

Referring to FIGURE 6, a fused hot line 54 is shown connected to the movable contact 28 of the switch 14 at each of the seats 10. As shown, the switches 14 are in their unoperated position and therefore, power from the line 54 cannot be applied to the lighting panel board in that a circuit cannot be completed from the contact 28 to the panel. Assuming a passenger occupies the seat 10, the movable contact 28 will make with a terminal 56 and thus complete a circuit to the light panel through the normally closed contacts 58 and 60 of the belt switch 32, via a line 62 to a lamp 64 and thence to the other side of the line 54 through ground. The light 64 will therefore be energized, and will indicate to a viewer that the seat belt at the particular seat has not been closed. When the passenger properly closes the seat belt, the movable contact 58 is moved by the lever 44 and the contact arm 45 and will open the circuit to the lamp 64 by making with an unconnected terminal 66. With reference to FIGURE 6, each seat 10 is uniquely wired to the hot line 54 and to an individual lamp 64 located at the panel 52. In this manner, the stewardess at her station may ascertain the operative conditions of all seat belts in the aircraft and through the construction of the switching devices incorporated in my invention, will be informed of the fact that when all the lamps are out, all occupants of the aircraft have properly fastened their seat belts.

Referring now to FIGURES 7 through 9 of the drawings, the preferred embodiment of the switching device as incorporated into a seat belt utilized for automotive vehicles is, like the aircraft installation, designed to be utilized in cooperation with a seat-mounted pressure-operated switch such as the switch 14 shown in FIGURE 2 of the drawings. In a like manner, the belt housing for the automotive embodiment may have a structure similar to the housing 30 heretofore described. For example, it may consist of two dome-shaped members 81 and 82 secured together by suitable means so as to form a central cavity 83 through which the seat belt may be passed. The members 81 and 82 may be made as in the previous case by molding vinyl plastisol. However, since weight requirements are not stringent in land vehicles, the housing members may be stamped from metals such as aluminum or they may be otherwise suitably formed.

Each of the members 81 and 82 is provided with an interior wall, 84 and 85 respectively, located within the cavity 83. A plate member 86 is pivotably mounted within the cavity 83 and is secured to one end of the housing between the members 81 and 82 in a manner similar to that described with reference to the member 48, FIGURE 5. The plate 86 may be made out of any suitable material and like plate 48 serves as a force conversion member. The belt 80 is passed through the belt housing and secured in a manner similar to that described relative to the aircraft embodiment, and in a similar fashion the belt slidably engages the top surface of the plate 86.

The switching structure for the land vehicle embodiment of my invention includes a switch housing 90 of generally rectangular configuration having at least a bottom wall, two side walls, and a slotted top wall. The housing 90 may be stamped from plastic sheet materials of any type that may be folded into the stated form and will retain their shape after folding.

The switch housing is supported within the cavity 83 by being cemented to a sloped top wall of a sponge rubber member 92, and the housing at the juncture of its top wall and a side wall normally abuts on the plate 86. The member 92 is firmly supported by being cemented to a bottom wall 93 of the cavity 83 and to the interior wall 85 of the belt housing member 82. In the preferred embodiment the sponge member 92 is provided with a pair of spaced apart cylindrical holes wherein are located a pair of coil springs 94. The springs extend from the wall 93 to the bottom wall of the switch housing 90.

A pair of elastic foam members 96 are cemented to the top wall of the housing 90 on either side of the slot. The foam members are similar to the member(s) 46 described heretofore (see FIGURE 5), and like that member they engage the bottom surface of the plate member 86.

A switch 98 is supported within the switch housing 90 by the bottom wall thereof. In the illustrated embodiment, the switch is rigidly mounted on a pair of spacers 100 which spacers are in turn rigidly secured to the bottom wall as by gluing when the housing 90 is formed from plastic materials.

The switch 98 is of the single pole-double throw type and is provided with a spring biased movable contact 102 operatively engaged by a lever 104. The lever 104 extends through the slot in the top wall of the housing 90 between the foam members 96 and frictionally engages the bottom surface of the plate member 86.

When the seat belt is not placed in tension the rubber, foam and spring members and the lever 104 are not under compression.

In operation, when an occupant of a seat equipped with the switching structure of this invention exerts tension on the belt 80 by pulling it so as to fasten the seat belt, such tension will cause the member 86 to pivot vertically within the cavity 83 about a pivot point located at the rear juncture of the members 81 and 82. In so doing, tensile forces on the belt are converted into compression forces on the members 92, 94, 96 and 104. It will thus be obvious that through the proper choice of elastic materials and through the proper choice of spring constants for the movable contact 102 that the various members can be set up to exert a predetermined resistive force to the operation of the switch 98, which resistance cannot be overcome until the belt has been placed in a proper degree of tension, which degree of tension corresponds to a snug fit of the belt around the pelvis of the occupant of the seat.

In the preferred embodiment of this invention, the major portion of the reaction to tensile forces exerted on the belt is taken up by the sponge rubber member and the springs secured therein. Initial compressive forces are exerted through the switch housing 90 on the sponge rubber member and the springs 94 when the belt 80 is placed in tension. These named members absorb 75% of these forces. Continued tension on the belt 80 causes the foam members to come under compression and at the same time causes the lever 104 to deflect against the resistance of the spring biased contact 102. Thus as will be obvious, the various elastic members provide a series of resistive forces to the operation of the switch 98 which total resistance can be set so that the switch will not operate until the belt 80 is placed under proper tension. The switch 98 can be utilized to signal the occupant of the seat to alert said occupant to the fact that the belt is or is not connected properly and in addition the switch can be used to give a signal at a central location as to the operated condition of all affected belts in the vehicle.

For the purpose of audibly indicating the condition of a seat belt to the occupant of the seat a buzzer 106 is mounted in the cavity 83 of the belt housing. The buzzer may be secured by any conventional means to a metallic plate member 108 which member is shaped to frictionally and forcibly engage with the member 82. The metal plate member may be secured by conventional means to the vehicle frame by extending it through the belt housing to thereby provide a ground connection to the buzzer.

The combined operation of the switches 14 and 98 within the framework of an electrical indicating system will be explained with reference to FIGURE 10 of the drawings. In the preferred embodiment of this invention, the car battery 110 is utilized as a source of electrical energy for operating the seat belt system. The battery 110 is connected through the usual ignition switch 112 to the ignition coil 114 of the vehicle which is connected to the motor distributor in the usual manner. The switch 112 is also connected to the movable contact 28 of the switch 14 through a fuse 113. Advantageously, the first switch 14 to which the battery is connected is located in the driver's seat of the vehicle. Switch 14 is shown in the operated position where the contact 28 makes with a contact 115, which in turn is connected to the movable contact 102 of the belt switch 98 by a lead 116. Contact 102 at switch 98 is shown made with a stationary contact 117, which contact is connected to the movable arm 28' of a switch 14' located in the first passenger's seat by a lead 118. Switch 98 is also provided with a second stationary contact 120 which is connected to the buzzer 106 located at the driver's seat. As shown, the driver's belt has been properly connected. Were this not so, the contact 102 would have made with the contact 120, thus completing an electrical circuit from the buzzer through the lead 116, contact 28, to fuse 113 to the battery 110, to ground, and back to the buzzer 106, causing the buzzer to operate. The buzzer will continue to operate until such a time as enough tension has been exerted on the driver's seat belt to cause the contact 102 to break with the stationary contact 120 and make with the contact 117.

The passenger's seat is shown unoccupied in FIGURE 10. Under these circumstances the movable contact 28' of the passenger's seat is connected through a lead 122 to a flasher unit 123 and a flasher lamp 124, and a circuit is thus completed from the lamp through the lead 118 back to the battery 111, thus energizing the lamp 124. The lamp 124 may be located at a central location and is used to indicate that the seat belts associated with occupied seats in a vehicle equipped with the system shown are fastened and fastened properly. It thus would serve as a signalling device located externally of the vehicle, and may be used to notify law enforcement officers that occupants of the vehicle have complied with any traffic safety legislation pertaining to safety seat belt use.

In the event that the passenger seat is occupied, the moving contact 28′ of switch 14′ will make with a stationary contract 126. This contract completes a circuit through a lead 128 to the contact 102′ of a switch 90′ located at the passenger's seat. As shown, switch 90′ has not been operated; thus a circuit is completed through the contact 102′ and stationary contact 130 to the buzzer 106′ and ground, thus energizing the buzzer. When the passenger seat belt is properly fastened, the contact 102′ will make with a stationary contact 132, thus de-energizing the buzzer 106′. At the same time, a circuit is completed over a lead 134 to the flasher unit 123 and a flasher lamp 124, thus completing a circuit to the battery 110 and to light the lamp. Although only two seats have been shown connected in the circuit diagram in FIGURE 10 of the drawings, quite obviously through appropriate connections made to other passenger seats, the system can be extended throughout the passenger vehicle no matter what seating capacity it might have.

The pressure sensitive seat switch 14 (see FIG. 2) can be manufactured so that a predetermined amount of weight can be allowed on passenger seats before pressure sensitive seat switch would be activated. The weight required to activate switch is controlled by the strength of two springs located at each end of switch housing and the switch housing is designed to prevent overthrow of the switch arm to prevent damage to the switch regardless of the amount of weight on seat over the predetermined amount required to activate switch as described in my copending application S.N. 484,655.

The new seat belt systems can be used with all approved lap-type seat belts in use or being produced as well as all approved shoulder type harness in use or being produced. The new belt systems also permit the snugness of the belt or shoulder harness to be determined in pounds or ounces of tension or slack in inches or both where this may be found desirable for the convenience of the vehicle passengers or operator or to operate the belt system in accordance with any police regulations or the like (see discussion in copending application S.N. 484,655.

The invention sought to be protected by United States Letters Patent is defined in the following claims.

I claim:

1. In a vehicle safety seat belt system including seats having seat belts attached thereto and a first pressure-sensitive switch for each seat in the system positioned such that an occupant of a seat equipped with a seat belt will automatically operate said switch, and including electrical circuit means for automatically indicating the operative condition of all seat belts in said system, the improvement which comprises:
   a seat belt;
   a second pressure-sensitive switch operatively connected to said circuit means and having an operating lever;
   means for mounting said operating lever of said switch and a face of said seat belt in operative relationship with each other such that tensile forces exerted on said seat belt are transmitted to said operating lever; and
   bias means separate from said lever operatively associated with said face of the seat belt for exerting a predetermined amount of force on said face in a direction opposed to the direction of any force exerted on said lever by said face of the seat belt.

2. A safety seat belt system according to claim 1 wherein said means for mounting comprises:
   a housing having at least a top wall and a spaced apart bottom wall, said second switch being mounted adjacent to said bottom wall, such that said operating lever extends towards said top wall; and
   a web member supported within said housing in spaced apart relationship to said top wall for movement relative to said top and bottom walls, and operatively engaging said switch operating lever, said seat belt extending between said top wall and said web member, and being in frictional engagement with said web member such that a tensile force exerted on said seat belt tends to move said web member towards said bottom wall against said operating lever.

3. A safety seat belt system according to claim 1 wherein said means for mounting is attached to a mounting lug of the belt system by an elastic member.

4. A safety seat belt system according to claim 1 wherein said means for mounting includes a cantilevered member operatively associated with said belt and said switch operating lever for linking said belt to said switch operating lever such that tensile forces exerted on said belt are applied to said operating lever, and wherein said bias means includes at least one resiliently compressible member positioned relative to said switch, said switch operating lever and said cantilevered member for exerting a predetermined force in opposition to the linkage of said belt and switch operating lever.

5. A safety seat belt system according to claim 4 wherein said second switch is supported within a switch housing, said housing being provided with a slotted top wall through which said operating lever extends, said housing being supported within said mounting means, and said compressible member being supported by said top wall of said switch housing.

6. A safety seat belt system according to claim 4 wherein said switch is supported within said mounting means within a switch housing having a top wall and a bottom wall, said lever extending through said top wall and engaging said cantilevered member; and
   a second resiliently compressible member secured to said mounting means, said switch housing being supported on said second compressible member.

7. A safety seat belt system according to claim 1 wherein said mounting means comprises:
   a belt housing, said seat belt extending through said housing;
   a linkage member pivotably mounted within said housing and operatively associated with said switch operating lever, said seat belt slidably engaging said member;
   a switch housing having at least a slotted top wall supported within said belt housing; said second switch being mounted within said switch housing and said operating lever of said switch extending through said slotted top wall;
   and wherein said bias means comprises:
   a first resiliently compressible member attached to said seat and said belt housing; and
   a second resiliently compressible member supported on said top wall of said switch housing and operatively abutting said linkage member.

8. A safety seat belt system according to claim 1 wherein said mounting means comprises:
   a belt housing, said seat belt extending through said housing;
   a linkage member pivotably mounted within said housing and operatively engaging said switch operating lever, said seat belt slidably engaging said member;
   a switch housing having at least a bottom wall and a slotted top wall supported within said belt housing, said second switch being mounted within said switch housing and said operating lever of said switch extending through said slotted top wall;
   and wherein said bias means comprises:
   a first resiliently compressible member supported by and within said belt housing, said switch housing being mounted on said first compressible member;

a second resiliently compressible member mounted within said first compressible member and engaging said belt housing and said bottom wall of said switch housing; and a third resiliently compressible member supported on said top wall of said switch housing and operatively engaging said linkage member.

9. A safety seat belt system according to claim 1 wherein said second pressure sensitive switch is provided with a spring biased movable contact arm.

10. A safety seat belt system for passenger aircraft having a safety seat belt attached to the frame of each seat within the aircraft comprising:

a pressure-sensitive switch mounted within the horizontal portion of each seat, said switch being provided with an operating lever positioned so as to be engaged and operated by the weight of an occupant of the seat;

a seat belt housing having at least a curved top wall and a curved bottom wall, said top wall being provided with a rearwardly projecting flange and a forwardly projecting slotted lip member, said bottom wall being provided with a rearwardly projecting flange and a forwardly projecting flange, said members being joined together at said rearwardly projecting flanges and by said forwardly projecting flange and said projecting lip member;

an elastic member for attaching said belt housing to a mounting lug for said seat belt;

a plate member movably mounted within said belt housing and supported between said rearwardly projecting flanges, said seat belt being passed through said housing between the flanges and lip member and slidably supported within said housing on the top surface of said plate member;

a switch housing having a slotted top wall supported within said belt housing by said bottom wall member;

a pair of resilient foam pads supported within said belt housing by said top wall of said switch housing on both sides of said slotted portion, said foam pads engaging the bottom surface of said plate member;

a single throw-double pole seat belt switch having a spring biased movable contact operatively engaged by an operating lever supported within said switch housing, said lever extending through said slotted top wall of said switch housing and engaging the bottom surface of said plate members;

a lighting panel positioned at a crew member's station within said aircraft, said lighting panel being provided with a plurality of incandescent lamps one each for each seat in the aircraft;

a source of electrical power; and a plurality of electrical connecting wires connecting said source of electrical power, said pressure-sensitive switch, said seat belt switch, and a lamp at said lighting panel such that said lamp is energized by operation of said pressure-sensitive switch and deenergized by said operation of said seat belt switch.

11. A safety seat belt system for land vehicles having a safety seat belt provided for each seat within said vehicle, said seat belt being attached to the frame of said vehicle comprising:

a pressure-sensitive switch mounted within the horizontal portion of each seat, said switch being provided with an operating lever positioned so as to be engaged and operated by the weight of an occupant of the seat;

a seat belt housing having a compartmented interior chamber, said housing comprising at least two shaped members provided with projecting flanges for joining said members together;

a plate member movably mounted within said housing and supported between said flanges, said seat belt being passed through said housing and slidably supported within said housing by a top surface of said plate member;

a resilient sponge rubber member secured to one of said belt housing members, said sponge rubber member being provided with a pair of cylindrical holes therethrough;

a pair of coil springs mounted within said holes of said sponge rubber member;

a switch housing having at least a slotted top wall, said switch housing being attached to said sponge rubber member;

a pair of resilient foam pad members supported by said top wall of said switch housing and mounted on either side of said slot, said foam members frictionally engaging the bottom surface of said plate member;

a single throw-double pole seat belt switch mounted within and supported by said switch housing, said switch being provided with a spring bias movable contact operatively engaged by an operating lever, said operating lever extending through the top wall of said switch housing and engaging the bottom surface of said plate member;

an audible device supported within said belt housing and electrically connected to said seat belt switch;

a source of electrical power;

a plurality of electrical wires connecting said source of electrical power, said pressure-sensitive switch, said seat belt switch and said audible device together such that said audible device is energized by operation of said pressure sensitive switch and deenergized by operation of said seat belt switch;

a flashing lamp mounted so as to be visible externally of said vehicle; and electrical connecting means for connecting said lamp to said source of electrical power, said seat belt switch and said pressure sensitive switch such that operation of said seat belt switch energizes said flashing lamp.

References Cited

UNITED STATES PATENTS

| | | | |
|---|---|---|---|
| 2,510,115 | 6/1950 | Jakosky | 297—385 X |
| 2,880,789 | 4/1959 | Leibinger | 297—385 X |
| 2,996,589 | 8/1961 | McCarthy | 280—150 |
| 3,154,167 | 10/1964 | Butler et al. | 297—385 X |
| 3,311,412 | 3/1967 | Kelly | 297—385 |

JAMES T. McCALL, *Primary Examiner.*